March 4, 1969     T. A. GEE     3,430,457

UNIVERSAL JOINT HAVING UNIQUE BOOT MEANS

Filed Jan. 26, 1967

INVENTOR
THOMAS A. GEE

BY

ATTORNEYS

United States Patent Office 3,430,457
Patented Mar. 4, 1969

3,430,457
UNIVERSAL JOINT HAVING UNIQUE BOOT MEANS
Thomas A. Gee, Allen Park, Mich., assignor to Eaton Yale & Towne Inc., Cleveland, Ohio, a corporation of Ohio
Filed Jan. 26, 1967, Ser. No. 612,010
U.S. Cl. 64—15                                   6 Claims
Int. Cl. F16d 3/52, 3/56, 3/66

ABSTRACT OF THE DISCLOSURE

A flexible sealing boot and retention arrangement for a spring-pack type of universal joint. The flexible boot is generally maintained in a desired shape during operation of the universal joint by individual bands which maintain substantial portions of the boot immediately adjacent to the internal spring-pack while providing convolutions for necessary elongation and contraction of the boot.

---

Figure 1:
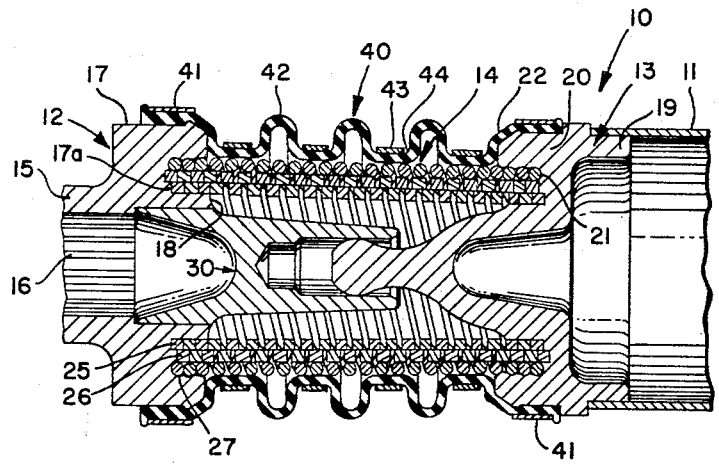

The present invention relates to flexible couplings and particularly to a universal joint having spring means for transmitting rotary motion and/or torque between drive and driven members, and a boot and retention arrangement therefor for protecting the spring means and retaining the lubrication grease or oil of the joint.

The boot structure of the present invention was developed to be utilized in combination with the unique spring-pack type of universal joint which was the subject of patents to Stuemky et al. No. 3,245,228, issued Apr. 12, 1966, and to Oldberg et al. No. 3,267,697, issued Aug. 23, 1966, both of which are assigned to the same assignee as the present application. In the unrestrained boot arrangements disclosed in the two beforenamed patents, it was found that the boot would expand during operation to undesired limits and would in fact skew to undesirable shapes and configurations which would adversely affect the operation of the universal joint.

Accordingly, it is a prime object of the present invention to provide a flexible boot and retention arrangement therefor for a universal joint mechanism utilizing telescoped spring sleeves for interconnecting drive and driven members and transmitting rotary motion and torque therebetween.

Another main object of the present invention is to provide a universal joint mechanism having a flexible boot structure retained within certain axial and radial limits to prevent uncontrolled expansion and skewing of the boot during operation of the joint.

Still another object of the present invention is to provide a boot arrangement for a spring-pack type of torque transmitting means for a universal joint wherein axially spaced bands retain sections of the boot immediately adjacent the spring means.

Yet another object of the present invention is the provision of a universal joint utilizing spring sleeve torque transmitting means as noted in the preceding paragraph wherein said spring sleeves have a truncated conical shape and the boot is of flexible rubber and molded with an axially tapered configuration corresponding to the tapered spring means.

A still further object of the present invention is the provision of a universal joint having torque transmitting spring-pack means having a truncated conical shape, a boot member surrounding said spring-pack means and having its internal diameter stepped to conform to the tapered dimensions of said spring-pack means, and constant diameter bands retaining sections of the boot immediately adjacent the spring means.

Another object of the present invention is to provide a boot or seal arrangement for a universal joint for retaining lubricant within certain radial limits, excluding outside contaminants from the lubricant and providing a space for collection through centrifugal force of wear products inside the universal joint.

Figure 2:
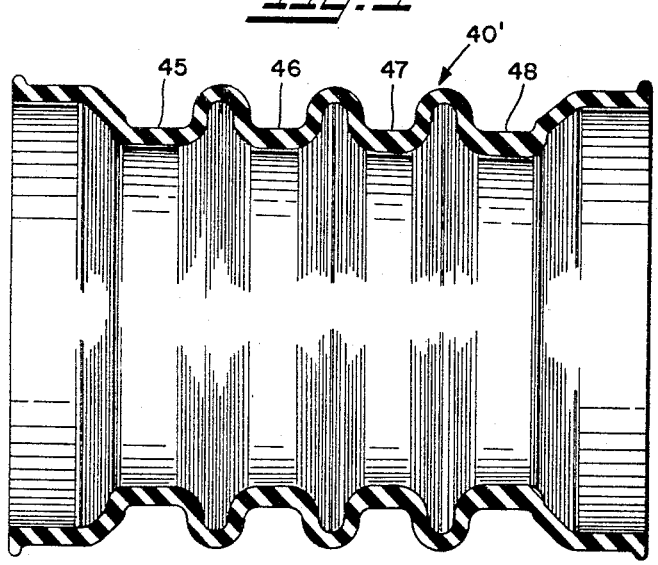

Further objects and advantages of the present invention will be apparent to those skilled in the art to which it relates from the following detailed description of a preferred embodiment thereof made with reference to the accompanying drawings forming a part of this specification and in which:

FIGURE 1 is an axial cross-sectional view of a universal joint embodying the present invention; and FIGURE 2 is an axial cross-sectional view of an internally stepped boot of the present invention.

Referring to the drawings, the preferred embodiment of the present invention comprises a universal joint 10 of the spring type for use in association with a drive shaft 11 of an automobile. The universal joint 10 illustrated in the drawing is a front end joint and transmits torque from the transmission of the automobile, not shown, to the drive shaft 11. The joint 10 comprises a drive means 12 operatively connected to the transmission to be driven thereby, a driven means 13 adapted to be connected to the drive shaft 11 and spring means 14 connected to the drive and driven members for transmitting torque therebetween in opposite directions.

The drive means 12 includes a hollow shaft portion 15 splined internally as shown at 16, which splined portion cooperates with a driving member, not shown, driven from the transmission. The driving means 12 also includes a radially extending flange or end cap portion 17 formed integrally with the hollow shaft portion 15 and connected thereto at the end thereof remote from the transmission. The end cap portion 17 of the driving means 12 has an annular extending channel recess 17a therein concentric with the axis of the shaft portion 15 and intersecting the surface 18 of the end cap portion 17 which surface faces axially and toward the drive shaft 11. The driven means 13 includes a shaft connecting portion 19 suitably fixed connected to the drive shaft 11 and an end cap portion 20 having an annular extending recess 21 therein which is concentric with the axis of the drive shaft 11 and which intersects the surface 22 of the end cap portion 20. The recesses 17a and 21 have substantially the same radial extent and axial depth, however, the recess 21 is located radially inwardly of the recess 17a because of the tapered shape of the spring means 14, for a purpose which will be apparent from the description hereinbelow.

A spring means 14 which transmits torque from the driving means 12 to the driven means 13 comprises a plurality of spring sleeves 25, 26 and 27. The spring sleeves extend coaxially and are nested or telescoped together with the spring sleeve 25 being the inner sleeve, the spring sleeve 26 being the intermediate sleeve, and the spring sleeve 27 being the outer sleeve. The opposite ends of each of the spring sleeves are suitably connected to the end cap portions 12 and 13 by a press-fit arrangement so as to transmit torque between said driving and driven members.

The universal joint 10 also includes a conventional ball and tube construction 30 which supports the driving and driven means for universal relative pivotal movement therebetween and also allows for longitudinal axial relative movement between the driving and driven members.

The spring sleeves 25, 26 and 27 are each made up of a plurality of individual coil spring members and interrelated in a particular manner. The inner spring sleeve 25 may comprise four to six individual spring members and preferably comprises five individual springs each of which is an open-wound lefthand spiral spring having coils or helixes which are rectangular in cross section. The spring sleeve 25, as are spring sleeves 26 and 27, is constructed by assembling the individual springs so that the coils thereof are interdigitated and in an axial spaced relationship. In view of the spiral shape of the spring members, the spring sleeves are in the form of a tapered cylindrical member having a truncated conical shape.

The number of coil springs utilized in the spring sleeve 26 may be four to six, while the outer spring sleeve 27 is preferably made up of six individual open-wound lefthand spiral coil springs. Middle spring sleeve 25 is constructed of coil springs having a rectangular cross section while the outer spring sleeve 27 is preferably made of coils having a circular cross section. All of the spring sleeves 25, 26 and 27 are preferably constructed of open-wound coil springs, that is, the pitch or spacing between adjacent turns of the individual coil springs is greater than the sum of the wire diameters of the individual coils therebetween, providing axial spacing between the individual coils. Such axial spaced spring-pack structure is found to be more durable than when no axial spacings are provided between the adjacent coils.

As described above, the spring units 25, 26 and 27 have a truncated conical shape. The truncated conical shape functions as an anticreep means for preventing coils of the spring sleeves from creeping or moving along coils of the adjacent spring sleeves toward one end of the universal joint. The direction of taper of the truncated conical spring sleeves is oriented in direction to prevent predictable creep under the most frequent and strenuous operating conditions of the universal joint. The truncated conical shape prevents a change in the pitch angle between the coils of the springs from one end of the unit to the other and maintains a uniform pitch angle for all the coils or the spring units when transmitting torque. Any change in the pitch of the coils of the spring units causes uneven distribution of the forces in the joint resulting in distortion and subsequent failure of the joint. Furthermore, the tapered configuration functions to prevent undesired creep in the universal joint between the spaced coils of the spring sleeves.

Further details of the particular spring-pack type of universal joint of the present invention can be found in beforenamed patents to Stuemky et al. No. 3,245,228 and to Oldberg et al. No. 3,267,697. A third application on the concept to Stuemky Ser. No. 424,785 is presently pending. Both the beforenamed patents and the application are all assigned to the same assignee as the present application.

The particular boot or closure 40 of the present application is fixed and sealed at its respective ends by suitable means as clamps 41, to end cap members 12 and 13 of the universal joint. Clamp means 41 for the respective ends of the universal joint are preferably of the same diameter. The boot or seal 40 is preferably of rubber material, but could be made of any suitable material having the requisite flexibility strength and ability to retain the lubricant during operation. The boot is preferably convoluted, as at 42, to enable axial elongation and contraction of the boot during relative movement of the driven and drive members 12 and 13. It has been found that as many as possible convolutions should be utilized in the boot which results in a higher speed capability for a given rubber strength and allowable deflection. Bands 43 are provided about boot 40 in order to prevent undue radial distortion and uncontrolled movement or skewing of the boot during operating conditions. The bands 43 maintain the adjacent sections 44 of the boot 40 in engagement or immediately adjacent the outer spring sleeve 27. Because of the tapered configuration of the spring means 14 as described hereinabove, it is necessary to provide increasingly smaller diameter bands 43, left to right, as seen in FIGURE 1. The bands 43 are of flexible material permitting limited radial movement of the spring means 25, 26 and 27.

A suitable lubricant such as a grease or oil is maintained within the universal joint by the boot 40. During operation of the universal joint, it has been found that the weight of the lubricant against the boot and the centrifugal force working upon the boot and lubricant during rotation thereof tend to expand and distort the boot to undesired dimensions; use of bands 43 with their substantial axial length, permits the boot to be generally maintained in the shape as seen in FIGURE 1 during operating conditions while still permitting the necessary convolutions for flexibility of the boot and the universal joint during operation.

The boot 40' of FIGURE 2 is of basically the same structure of the boot of FIGURE 1 except for its stepped internal diameter of sections 45, 46, 47 and 48. Sections 45–48 as shown in FIGURE 2 are of decreasing internal diameter, left to right, to account for the tapered conical shape of the spring sleeves as 14 of FIGURE 1, about which boot 40' is maintained in surrounding relationship. The internal stepped arrangement of FIGURE 2 permits a utilization of equal diameter bands 43 during manufacture of the universal joint. Such use of equal diameter bands 43 is more economical and expeditious for manufacturing purposes than that arrangement of stepped bands as shown in FIGURE 1.

It should be further understood that the preferred embodiments of the present invention have been described hereinabove in great detail and that certain modifications, changes and adaptations therein may be made by those skilled in the art to which it relates and it is intended hereby to cover all such changes, adaptations and modifications falling within the scope of the appended claims.

Having described my invention, I now claim:

1. A flexible boot and universal joint mechanism comprising:
   spaced drive and driven members,
   torque transmitting spring means interconnecting said drive and driven members,
   said spring means including at least two spring sleeves of substantially equal lengths in a telescoped relation with one spring sleeve positioned within the other and extending coextensively therewith, each of said sleeves comprising a plurality of open-wound springs with the coils thereof interdigitated,
   said spring means having a truncated conical shape to prevent variance in the pitch angle between the coils of the spring sleeve during operation,
   a boot member surrounding said spring means and affixed at its ends by clamp means to said drive and driven members,
   said boot means being of flexible rubber-like material and molded with an axially tapered internally stepped configuration corresponding to the dimensions of said truncated conical spring means, and
   axially spaced bands retaining sections of said boot immediately adjacent to said spring means.

2. The universal joint mechanism as set forth in claim 1 wherein:
   the bands are all of the same diameter.

3. The universal joint mechanism as set forth in claim 1 wherein:
   the clamps are of the same diameter.

4. A flexible boot and universal joint mechanism comprising:
   spaced drive and driven members,
   torque transmitting spring means interconnecting said drive and driven members,
   said spring means including at least two spring sleeves of substantially equal lengths in a telescoped relation with one spring sleeve positioned within the other and extending coextensively therewith, each of said sleeves comprising a plurality of open-wound springs with the coils thereof interdigitated,
   said spring means having a truncated conical shape to prevent variance in the pitch angle between the coils of the spring sleeves during operation,
   a boot member surrounding said spring means and affixed at its ends by clamp means to said drive and driven members, said boot member being of rubber-like material and of constant dimensions throughout its axial length with each band being of different diameter to correspond to the dimensions of the truncated conical spring means, and axially spaced bands retaining sections of said boot immediately adjacent to said spring means.

5. In a universal joint mechanism having spaced drive and driven members, and torque transmitting spring members interconnecting said drive and driven members, the improvement of a boot member surrounding said spring means and fixed at its ends by clamp means to said drive and driven members and said boot member having axially spaced flat annular lands interposed between convolutions along the length thereof, the material of the boot being thicker under the lands than in the convolutions to limit the flexing under the lands and immediately adjacent thereto and confine the flexing to the centers of the convolutions, and axially spaced band means retaining said lands of said boot immediately adjacent to said spring means of said universal joint mechanism.

6. A flexible boot and universal joint mechanism comprising:

spaced drive and driven members, torque transmitting spring means interconnecting said drive and driven members, a boot member surrounding said spring means and affixed at its ends by clamp means to said drive and driven members, axially spaced bands retaining sections of said boot immediately adjacent to said spring means, and said bands being of flexible material permitting limited radial movement of the spring means.

References Cited

UNITED STATES PATENTS

| 350,631 | 10/1886 | Leaman | 64—15 |
|---|---|---|---|
| 2,755,643 | 7/1956 | Wildhaber | 64—32 |
| 3,063,266 | 11/1962 | Rabson | 64—32 |
| 3,204,427 | 9/1965 | Dunn | 64—8 |
| 3,245,228 | 4/1966 | Stuemky et al. | 64—15 |
| 3,267,697 | 8/1966 | Oldberg et al. | 64—15 |

HALL C. COE, *Primary Examiner.*

U.S. Cl. X.R.

64—32